United States Patent [19]
Shin

[11] Patent Number: 5,809,609
[45] Date of Patent: Sep. 22, 1998

[54] SPEED-RESPONSIVE WIPER FOR CAR

[75] Inventor: Yong Soo Shin, Kyonggi-do, Rep. of Korea

[73] Assignee: Kia Motors Corporation, Seoul, Rep. of Korea

[21] Appl. No.: 698,103

[22] Filed: Aug. 15, 1996

[30]  Foreign Application Priority Data

Jul. 23, 1996 [KR]  Rep. of Korea ................. 1996-29669

[51] Int. Cl.⁶ .................................................... B60S 1/06
[52] U.S. Cl. ............... 15/250.12; 15/250.3; 318/DIG. 2; 318/443; 318/461; 180/271; 180/337
[58] Field of Search ............................ 15/250.12, 250.13, 15/250.3; 318/DIG. 2, 461, 543, 443, 444; 307/10.1; 180/337, 271

[56]  References Cited

U.S. PATENT DOCUMENTS 4,419,611  12/1983  Kawasaki et al. ................. 318/DIG. 2
4,999,550  3/1991  Jones ................................. 318/DIG. 2

FOREIGN PATENT DOCUMENTS 18051  1/1984  Japan ................................. 15/250.12
45252  3/1984  Japan ................................. 15/250.12

*Primary Examiner*—Gary K. Graham

[57]  ABSTRACT

A speed-responsive wiper for a car which includes a plurality of push switches respectively disposed at different stage portions of an indicator of the car at which a gear-shifting lever is disposed, and a plurality of resistors respectively having different resistance values. Each resistor is connected between each corresponding push switch and a wiper motor. By this construction, the drive speed of the wiper is automatically adjusted in accordance with a varied position of the gear-shifting lever depending on the running speed of the car.

4 Claims, 2 Drawing Sheets

SPEED-RESPONSIVE WIPER FOR CAR

BACKGROUND OF THE INVENTION

1. Field of the Invention

The present invention relates to a speed-responsive wiper for cars, and more particularly to a speed-responsive wiper capable of adjusting its wiping speed in response to the vehicle speed of a car to which the wiper is applied.

2. Description of the Prior Art

Window wipers provide clear vision to a driver during rain or snowfall. Such wipers include a wiper blade adapted to slide along the surface of a glass, in particular, the front glass of a car while being in contact with the glass, together with a wiper arm, a wiper motor, and a link. Wipers are classified into those of the electrical type and those of the vacuum type in accordance with their driving systems. Vacuum type wipers operate using negative suction pressure of the suction manifold of the engine. On the other hand, electrical type wipers operate using an electrical motor. Such electrical type wipers are mainly used for cars because they have advantages of reliability in operation and easy adjustment in wiping or drive speed. Wiper motors are classified into those of the single stage type, which drive at a constant speed, and those of the double stage type, which drive at a speed variable between a low speed and a high speed. It may be advantageous to vary the driving speed of a wiper in accordance with the condition of weather. In view of this fact, double stage type wipers are mainly used. In addition to the above-mentioned wipers, there are a variety of wipers. For example, a wiper which drives intermittently is known. There is also a wiper equipped with an automatic positioning device.

The configuration of a conventional circuit for driving a car wiper will now be described in conjunction with FIGS. 1A and 1B.

As shown in FIGS. 1A and 1B, the wiper driving circuit includes a battery B+ for supplying power to a wiper motor W/M, a switch SW for selectively connecting the wiper motor W/M to the battery B+, and a cam CAM operatively connected to the wiper motor W/M.

The operation of the conventional wiper driving circuit will now be described.

In accordance with the switched position of the switch SW selected by the driver, the wiper motor W/M is controlled to flow current through one of its series coil $L_1$ or shunt coil $L_2$ so that it can be driven at a low or high speed. FIG. 1A shows a switched position of the switch SW when the wiper is driven at a low speed, whereas FIG. 1B shows a switched position of the switch SW when the wiper is driven at a high speed.

However, the above-mentioned conventional construction is troublesome in that the driver manually manipulates the switch in accordance with the rainfall or car speed to adjust the drive speed of the wiper. For example, when the car is accelerated under the condition that the rainfall is substantially constant, the amount of raindrops on the front glass of the car increases. On the other hand, when the car is decelerated, the amount of raindrops on the front glass decreases. In this regard, the driver should manipulate the switch to adjust the drive speed of the wiper in accordance with the car speed. This manipulation is troublesome.

SUMMARY OF THE INVENTION

An object of the invention is to provide a speed-responsive wiper for a car capable of automatically adjusting its drive speed in accordance with the speed vehicle.

In accordance with the present invention, this object is accomplished through a speed-responsive wiper for a car comprising: a wiper motor for driving a wiper member; a battery for supplying power to the wiper motor; a wiper switch for selectively connecting the wiper motor to the battery by a driver's manipulation; a gear-shifting lever for changing running speed of the car, the gear-shifting lever having different positions respectively corresponding to different running speeds of the car; an indicator having different speed change stage portions respectively corresponding to the different positions of the gear-shifting lever; a plurality of push switches each connected between the wiper switch and the wiper motor, the push switches corresponding to the different speed change stage portions of the indicator in such a manner that when the gear-shifting lever is disposed at a selected speed change stage portion of the indicator, one of the push switches associated with the selected speed change stage portion of the indicator is switched to its ON state; and a plurality of resistors respectively connected between the push switches and the wiper motor.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

In order to obtain an optimum running condition, drivers perform a gearshift using a gear-shifting lever, thereby changing the running speed. Although there is a slight difference among drivers, the gearshift is carried out to drive a car in a primary stage at a running speed of up to 20 Km/h, in a secondary stage at a running speed ranging from 30 Km/h to 40 Km/h, and in a third stage at a running speed ranging from 35 Km/h to 60 Km/h. At a maximum running speed, the car is driven in a fifth stage. To achieve such a gearshift, the gear-shifting lever is manipulated. At this time, the gear-shifting lever varies in position. The present invention is premised on the fact that the gear-shifting lever has different positions respectively corresponding to different speed change stages. In accordance with the present invention, push switches with different resistances are disposed at different stage portions of an indicator at which the gear-shifting lever is disposed, respectively, so that the drive speed of the wiper can vary depending on a variation in vehicle speed of the car resulting from a variation in position of the gear-shifting lever. The push switches are connected to a wiper motor.

Figure 1A:
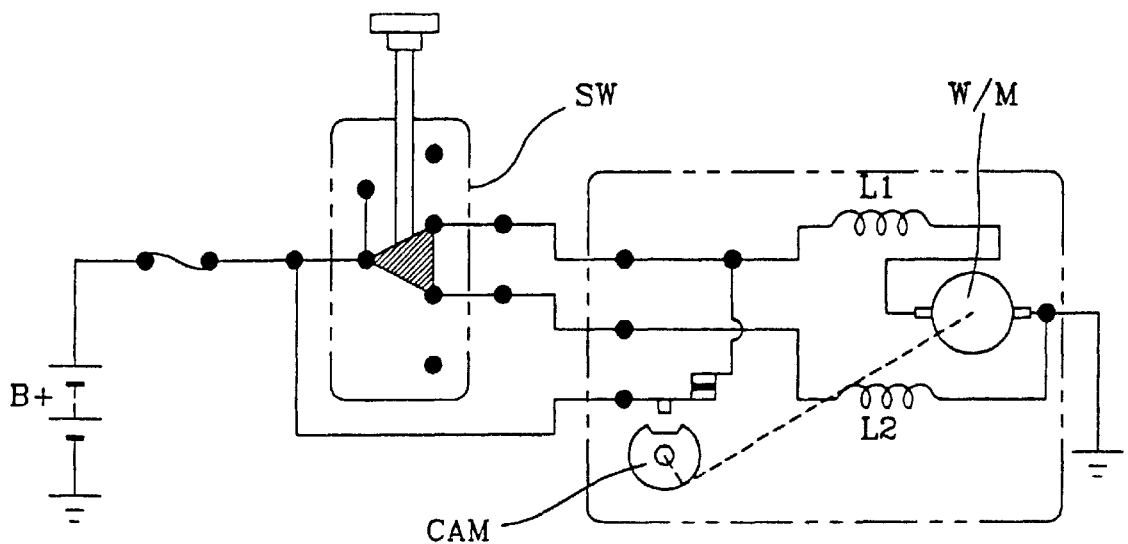
FIGS. 1A and 1B are circuit diagrams of a conventional circuit for driving a car wiper.
Figure 1B:
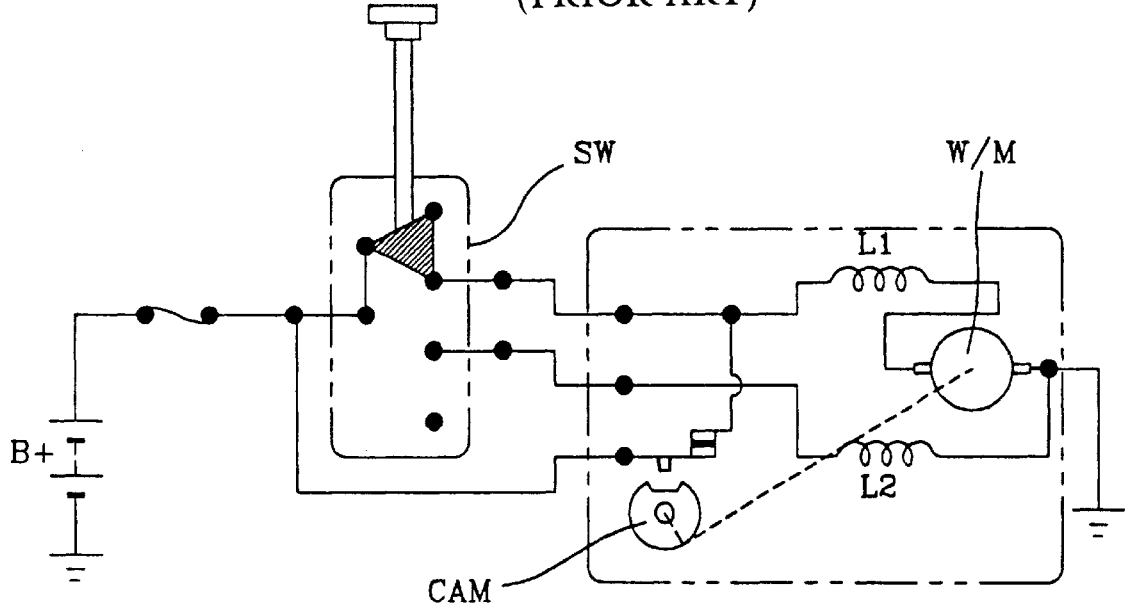
Figure 2:
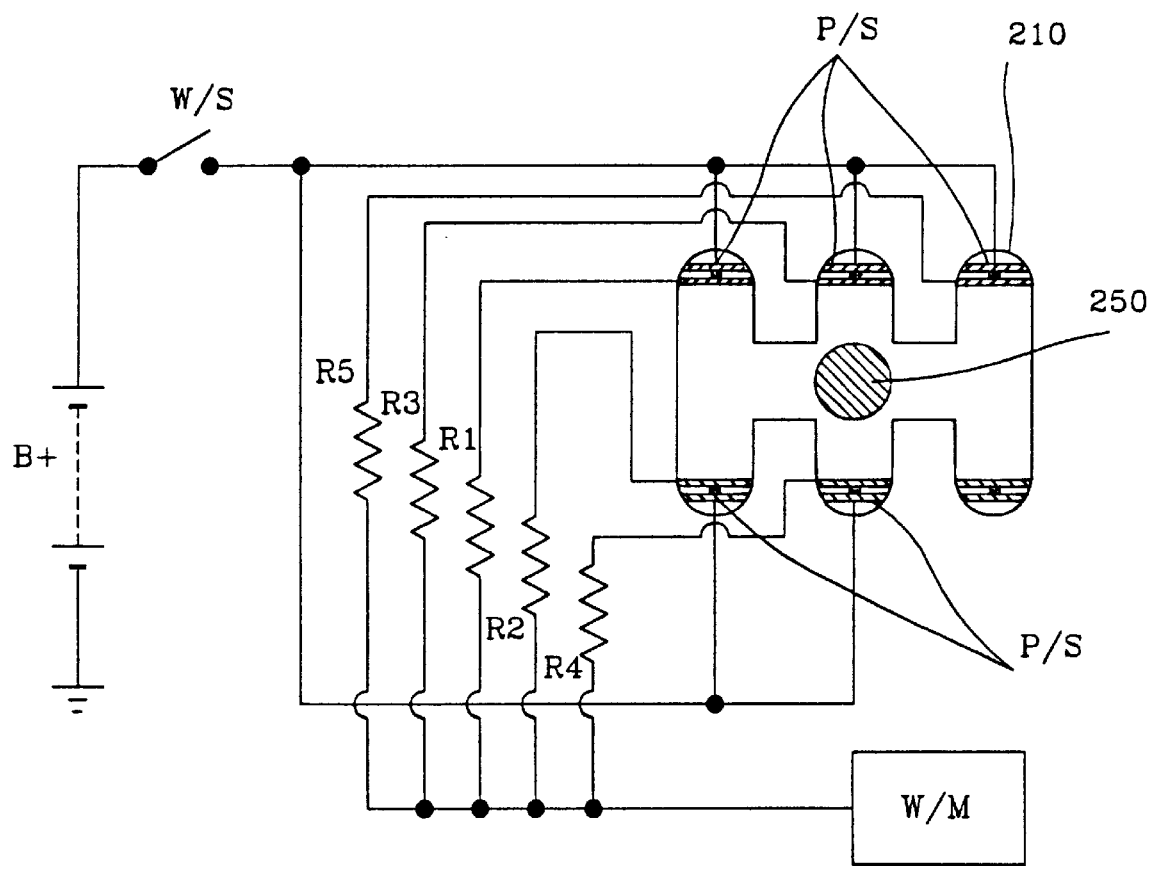
FIG. 2 is a circuit diagram of a drive circuit included in a speed-responsive car wiper in accordance with the present invention.

FIG. 2 illustrates a circuit for driving a car wiper in accordance with the present invention. As shown in FIG. 2, the wiper driving circuit of the present invention includes a battery B+ for supplying power to a wiper motor W/M. A wiper switch SW is connected to the battery B+ to selectively connect the wiper motor W/M to the battery B+ so that the wiper can be driven. A plurality of push switches P/S are connected at one side of their terminals to the wiper switch SW in a branched fashion. The push switches P/S are disposed at different stage portions of an indicator 210 of the car which indicate different stage positions of a gear-shifting lever 250 of the car, respectively. When an optional one of the push switches P/S is pushed as the gear-shifting lever 250 is shifted to dispose at a stage portion of the indicator 210 corresponding to that push switch P/S, the switch terminals contact each other, thereby energizing the wiper motor W/M. The push switches P/S are connected at the other side of their terminals to the wiper motor W/M via resistors $R_1$ to $R_5$ having different resistance values corresponding to different drive speeds of the wiper motor W/M, respectively. Since the push switches P/S are connected to the wiper motor W/M via resistors $R_1$ to $R_5$, respectively, the wiper motor W/M is driven at a speed varying in accordance with a varied position of the gear-shifting lever 250.

In other words, the resistors $R_1$ to $R_5$ respectively connected to the push switches P/S have different resistance values in such a manner that the wiper motor W/M drives at a lowest speed when the gear-shifting lever 250 is disposed at its lowest stage position while driving at an increased speed as the gear-shifting lever 250 shifts to its higher stage position.

Instead of the push switches P/S, a sensor for sensing a shifted position of the gear-shifting lever 250 may be used. Although the present invention is applied to the gear-shifting lever 250 which is associated with a manual speed change device, it may also be applied to an automatic gear-shifting lever associated with an automatic speed change device.

When the car is driven in an ON state of the wiper switch under the condition of rain or snow, a selected one of the push switches disposed at respective stage portions of the indicator of the car is switched on in accordance with the corresponding position of the gear-shifting lever. At this time, power from the battery B+ is supplied to the wiper motor W/M via a selected one of the resistors $R_1$ to $R_5$ respectively having different resistance values. Since the distribution of the resistance values of the resistors $R_1$ to $R_5$ is appropriately determined, it is possible to appropriately adjust the drive speed of the wiper in accordance with the shifted position of the gear-shifting lever, namely, the varied speed of the car.

As apparent from the above description, the present invention provides a speed-responsive wiper for a car which includes a plurality of push switches respectively disposed at different stage portions of an indicator of the car at which a gear-shifting lever is disposed, and a plurality of resistors respectively having different resistance values. Each resistor is connected between each corresponding push switch and a wiper motor. By such a construction, the drive speed of the wiper is automatically adjusted in accordance with a varied position of the gear-shifting lever depending on the running speed of the car.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A speed-responsive wiper for a car comprising:

a wiper motor for driving a wiper member;

a battery for supplying power to the wiper motor;

a wiper switch for selectively connecting the wiper motor to the battery by a driver's manipulation;

a gear-shifting lever for changing running speed of the car, the gear-shifting lever having different positions respectively corresponding to different running speeds of the car;

an indicator having different speed change stage portions respectively corresponding to the different positions of the gear-shifting lever;

a plurality of push switches each connected between the wiper switch and the wiper motor, the push switches corresponding to the different speed change stage portions of the indicator in such a manner that when the gear-shifting lever is disposed at a selected speed change stage portion of the indicator, one of the push switches associated with the selected speed change stage portion of the indicator is switched to its ON state; and a plurality of resistors respectively connected between the push switches and the wiper motor.

2. The speed-responsive wiper in accordance with claim 1, wherein the resistors connected to the push switches have different resistance values, respectively.

3. A speed-responsive wiper for a car, comprising:

a wiper motor for driving a wiper member;

a battery for supplying power to the wiper motor;

a wiper switch for selectively connecting the wiper motor to the battery through driver manipulation;

shifting means for changing a running speed of the car;

indicator means having different speed change state portions respectively corresponding to different positions of the shifting means;

a plurality of resistors having different resistance values and being respectively connected to the wiper motor; and means connected between the wiper switch and the resistors and being responsive to the indicator means for actuating the wiper motor selectively through one of said resistors as a result of the shifting means being disposed at a selected speed change portion of the indicator means.

4. A speed responsive wiper for a car, comprising:

a wiper motor for driving a wiper member;

a battery for supplying power to the wiper motor;

a wiper switch for selectively connecting the wiper motor to the battery through driver manipulation;

a gear-shifting lever for changing the running speed of the car, said gear-shifting lever having different positions respectively corresponding to different running speeds of the car;

an indicator having different speed change state portions respectively corresponding to the different positions of the gear-shifting lever;

a plurality of means for connecting the wiper switch to the motor, said connecting means corresponding to different speed change state portions of the indicator such that when the gear-shifting lever is disposed at a selected speed change state portion of the indicator, one of said connecting means associated with the selected speed change state portion of the indicator is actuated; and a plurality of resistors respectively connected between the connecting means and the wiper motor.

* * * * *